(12) United States Patent
Abrol (10) Patent No.: US 9,335,004 B2
(45) Date of Patent: May 10, 2016

(54) METHOD AND SYSTEM FOR USE IN COMBUSTION PRODUCT CONTROL

(71) Applicant: General Electric Company, Schenectady, NY (US)

(72) Inventor: Sidharth Abrol, Greenville, SC (US)

(73) Assignee: General Electric Company, Schenectady, NY (US)

( * ) Notice: Subject to any disclaimer, the term of this patent is extended or adjusted under 35 U.S.C. 154(b) by 636 days.

(21) Appl. No.: 13/707,770

(22) Filed: Dec. 7, 2012

(65) Prior Publication Data

US 2014/0162199 A1 Jun. 12, 2014

(51) Int. Cl.
*F01N 3/00* (2006.01)
*F01N 3/10* (2006.01)
(Continued)

(52) U.S. Cl.
CPC .............. *F17D 3/00* (2013.01); *B01D 53/8625* (2013.01); *B01D 53/8696* (2013.01); *F01N 3/208* (2013.01); *F01N 3/2066* (2013.01); *F23J 15/02* (2013.01); *F23N 5/003* (2013.01); *B01D 2251/2062* (2013.01); *F01N 2560/00* (2013.01); *F23J 2219/10* (2013.01); *F23N 2023/38* (2013.01); *F23N 2900/05003* (2013.01); *Y02E 20/16* (2013.01); *Y10T 137/0335* (2015.04); *Y10T 137/7722* (2015.04)

(58) Field of Classification Search
CPC ... F01N 3/2066; F01N 3/208; F01N 2560/00; F01N 2560/021; F01N 2560/02; F17D 3/00; F23J 15/02; F23N 5/003; B01D 53/8625; B01D 53/8696

USPC ...................... 60/276, 286, 287, 301; 431/253
See application file for complete search history.

(56) References Cited

U.S. PATENT DOCUMENTS 6,123,910 A 9/2000 Yoshii et al.
6,761,025 B1 7/2004 Gladden
(Continued)

OTHER PUBLICATIONS

Nova, Isabella, et al., "NH3-SCR of NO over a V-based catalyst: Low-T redox kinetics with NH3 inhibition," AIChE Journal vol. 52, No. 9, Sep. 2006, pp. 3222-3233.
(Continued)

*Primary Examiner* — Kenneth Rinehart
*Assistant Examiner* — William G Corboy
(74) *Attorney, Agent, or Firm* — Armstrong Teasdale LLP (57) ABSTRACT

A combustion product control system includes a first sensing device that measures a concentration of $NO_x$ in a fluid stream and a second sensing device that measures $NH_3$ slip in the stream. The system also includes at least one combustion product control element. The system further includes at least one processor coupled to the sensing devices and the control element. The processor is programmed to generate predetermined parameters for $NO_x$ values in the stream at least partially as a function of transient stream conditions. The processor is also configured to use model predictive control (MPC) processing to generate predetermined values for a $NH_3$ injection rate during stream transients. The predetermined values vary at least partially as a function of modeled stream characteristics. The processor is further configured to regulate the control element to facilitate simultaneous regulation of the $NO_x$ and $NH_3$ slip in the stream within respective predetermined parameters.

17 Claims, 7 Drawing Sheets

(51) Int. Cl.
*F17D 3/00* (2006.01)
*F01N 3/20* (2006.01)
*F23J 15/02* (2006.01)
*F23N 5/00* (2006.01)
*B01D 53/86* (2006.01)

(56) References Cited

U.S. PATENT DOCUMENTS

| | | | |
|---|---|---|---|
| 6,993,900 B2 | 2/2006 | Upadhyay et al. | |
| 7,093,427 B2 | 8/2006 | van Nieuwstadt et al. | |
| 7,398,149 B2 | 7/2008 | Ueno et al. | |
| 7,400,967 B2 | 7/2008 | Ueno et al. | |
| 7,824,636 B1 | 11/2010 | Kraemer et al. | |
| 7,846,405 B2 | 12/2010 | Lanier et al. | |
| 7,914,747 B1 | 3/2011 | Kraemer | |
| 7,966,098 B2 | 6/2011 | van Wijck | |
| 8,010,236 B2 | 8/2011 | Jambhekar et al. | |
| 8,032,235 B2 | 10/2011 | Sayyar-Rodsari | |
| 8,108,073 B2 | 1/2012 | Jambhekar et al. | |
| 8,181,451 B2 | 5/2012 | VanderVeen et al. | |
| 8,640,448 B2 * | 2/2014 | Geveci | F01N 3/208 60/274 |
| 2007/0156288 A1 | 7/2007 | Wroblewski et al. | |
| 2008/0071395 A1 | 3/2008 | Pachner | |
| 2011/0036066 A1 * | 2/2011 | Zhang | F01D 25/305 60/39.5 |
| 2011/0154806 A1 | 6/2011 | Hoyte et al. | |
| 2011/0192147 A1 * | 8/2011 | Hoskin | F01N 3/208 60/286 |
| 2012/0059525 A1 | 3/2012 | Piche | |
| 2013/0104530 A1 * | 5/2013 | Geveci | G01N 27/407 60/301 |
| 2014/0096532 A1 * | 4/2014 | Broderick | F23J 15/003 60/774 |

OTHER PUBLICATIONS

Chatterjee, D., et al., "Numerical simulation of Zeolite-and V-based SCR catalytic converters," No. 2007-01-1136, SAE International Technical Paper, 2007 World Congress, Detroit, MI, Apr. 16-19, 2007 (14 pgs).

Koebel, Manfred, et al., "Reaction pathways in the selective catalytic reduction process with NO and NO2 at low temperatures," Industrial & Engineering Chemistry Research, vol. 40, No. 1 (2001), pp. 52-59.

Forzatti, Pio, "Present status and perspectives in de-NOx SCR catalysis," Applied Catalysis A: General, vol. 222, No. 1 (2001), pp. 221-236.

* cited by examiner

METHOD AND SYSTEM FOR USE IN COMBUSTION PRODUCT CONTROL

BACKGROUND OF THE INVENTION

The present application relates generally to combustion product control, and more particularly, to a method and system for use in simultaneous control of oxides of nitrogen ($NO_x$) and ammonia ($NH_3$) slip downstream of a selective catalytic reduction (SCR) system.

At least some known electric power generating facilities include combined cycle power plants that include one or more gas turbines, at least one heat recovery steam generator (HRSG), and at least one steam turbine. The HRSG and the steam turbine are coupled in flow communication through steam piping. The gas turbines and the HRSG are coupled in flow communication through combustion gas ducts. The gas turbines are operated to generate power, i.e., typically electric power. A combustion exhaust gas stream including waste heat in generated by the gas turbines is channeled to the HRSG to generate steam through the combustion gas ducts. The steam is channeled to the steam turbines to generate power, i.e., typically electric power.

Many known HRSGs include a selective catalytic reduction (SCR) system for removing regulated combustion products, e.g., nitrogen oxides ($NO_x$) from the combustion exhaust gas stream prior to exhausting the gases to the atmosphere through an exhaust stack. Many known SCR systems include a bed of catalyst for removing at least some of the $NO_x$ from the exhaust gas stream. A reductant, such as ammonia ($NH_3$), is injected into the exhaust gas stream entering the SCR system to facilitate further removal of $NO_x$ from the exhaust gas prior to entering the stack and then the atmosphere. Not all of the $NH_3$ may be reacted with the exhaust gases and some of the unreacted $NH_3$ passes through the SCR system and exits the exhaust system with the exhaust gas. Such unreacted $NH_3$ is referred to as "ammonia slip." Such ammonia slip typically becomes more prevalent during load transients of the combined cycle power systems with the accompanying exhaust gas transients, i.e., startups, shutdowns, and electric power generation ramps that approach and/or exceed certain power generation ramp parameters.

Many of the known SCR systems include a control architecture that includes a cascaded structure with an outer control loop for $NH_3$ injection that includes a $NO_x$ measurement in the stack as the primary variable. The outer control loop establishes a $NH_3$ injection flow rate setpoint. The cascaded control architecture also includes an inner control loop that includes $NH_3$ slip as measured in the stack as a secondary variable. The inner loop for the $NH_3$ slip facilitates maintaining the $NH_3$ injection rate close to the setpoint generated by the outer control loop. Each of the outer loop and the inner loop includes a dedicated proportional-integral-differential (PID) controller. Each of the two PID controllers also receives $NO_x$ and $NH_3$ measurements from the gas turbines and the stack through a continuous emissions monitoring system (CEMS). The $NH_3$ injection flow rate is regulated to maintain measured $NO_x$ close to a predetermined stack $NO_x$ setpoint. Such regulation is accomplished fairly easily during steady-state operation of the combined cycle power system by establishing a substantially constant $NH_3$ injection flow rate setpoint and regulating the flow to that setpoint. However, during significant transients, e.g., step changes in exhaust gas generation during startups and shutdowns, as well as steep load ramps during certain electric power dispatching situations, sequences of constant $NH_3$ injection flow rates through a sequence of constant setpoints facilitates either one of $NO_x$ excursions and/or $NH_3$ slip excursions. Typically, the control systems overcompensate with the $NH_3$ injection flow rates to mitigate $NO_x$ excursions, thereby increasing $NH_3$ slip excursions with the resultant excess costs of $NH_3$ waste.

BRIEF DESCRIPTION OF THE INVENTION

In one embodiment, a combustion product control system is provided. The combustion product control system includes a first sensing device configured to measure a concentration of oxides of nitrogen ($NO_x$) in a fluid stream. The combustion product control system also includes a second sensing device configured to measure ammonia ($NH_3$) slip in the fluid stream. The combustion product control system further includes at least one combustion product control element. The combustion product control system also includes at least one processor coupled to the first sensing device, the second sensing device, and the at least one combustion product control element. The at least one processor is programmed to generate predetermined parameters for $NO_x$ values in the fluid stream at least partially as a function of transient fluid stream conditions. The at least one processor is also programmed to use model predictive control (MPC) processing to generate predetermined values for a $NH_3$ injection rate during fluid stream transients. The predetermined values vary at least partially as a function of modeled fluid stream characteristics. The at least one processor is further programmed to regulate the at least one combustion product control element to facilitate simultaneous regulation of the measured concentration of $NO_x$ in the fluid stream within the predetermined $NO_x$ parameters and regulation of the measured $NH_3$ slip in the fluid stream within predetermined $NH_3$ slip parameters.

In another embodiment, a method of controlling combustion products is provided. The method includes transmitting a signal representative of a concentration of oxides of nitrogen ($NO_x$) in a fluid stream to at least one processor. The method also includes transmitting a signal representative of an ammonia ($NH_3$) slip in the fluid steam to the at least one processor. The method further includes generating, within the at least one processor, predetermined parameters for $NO_x$ values in the fluid stream at least partially as a function of transient fluid stream conditions. The method also includes generating predetermined values for $NH_3$ injection during fluid stream transients using model predictive control (MPC) algorithms programmed within the at least one processor. The predetermined values vary at least partially as a function of modeled fluid stream characteristics. The method further includes regulating at least one combustion product control element, thereby simultaneously regulating the measured concentration of $NO_x$ in the fluid stream within the predetermined $NO_x$ parameters and regulating the measured $NH_3$ slip in the fluid stream within predetermined $NH_3$ slip parameters.

In yet another embodiment, a power generation facility is provided. The power generation facility includes at least one combustion gas source configured to generate a combustion gas stream. The power generation facility also includes at least one selective catalytic reduction (SCR) system coupled to the at least one combustion gas source and configured to receive at least a portion of the combustion gas stream. The power generation facility further includes a combustion product control system including a first sensing device configured to measure a concentration of oxides of nitrogen ($NO_x$) in the combustion gas stream. The combustion product control system also includes a second sensing device configured to measure ammonia ($NH_3$) slip in the combustion gas stream. The combustion product control system further includes at least one $NH_3$ flow control device. The combustion product control system also includes at least one processor coupled to the first sensing device, said second sensing device, and at least one $NH_3$ flow control device. The at least one processor is programmed to generate predetermined parameters for $NO_x$ values in the combustion gas stream at least partially as a function of transient combustion gas stream conditions. The at least one processor is also programmed to use model predictive control (MPC) processing to generate predetermined values for a $NH_3$ injection rate during combustion gas stream transients. The predetermined values vary at least partially as a function of modeled operational characteristics of at least one of the power generation facility and the combustion gas stream. The at least one processor is further programmed to regulate the at least one $NH_3$ flow control device to facilitate simultaneous regulation of the measured concentration of $NO_x$ in the combustion gas stream within the predetermined $NO_x$ parameters and regulation of the measured $NH_3$ slip in the combustion gas stream within predetermined $NH_3$ slip parameters.

DETAILED DESCRIPTION OF THE INVENTION

Figure 1:
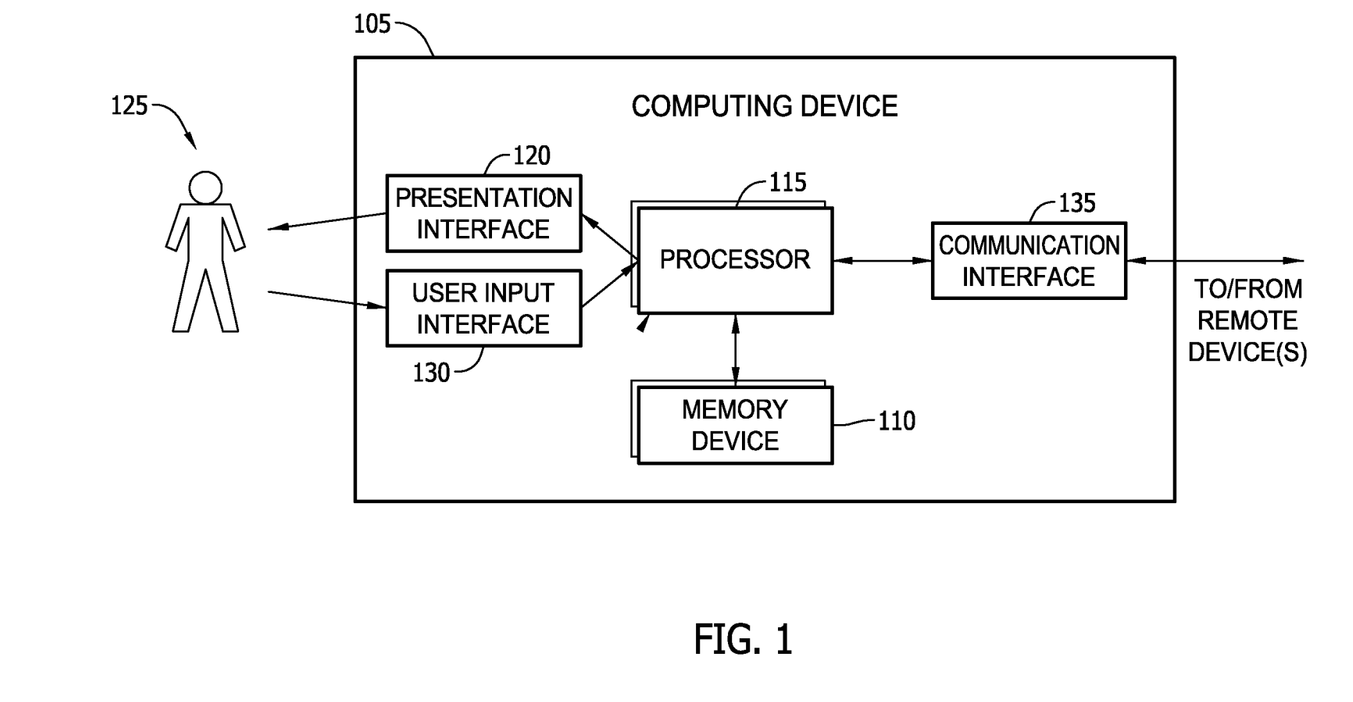
FIG. 1 is a block diagram of an exemplary computing device.

FIG. 1 is a block diagram of an exemplary computing device 105 that may be used to perform monitoring of any piece of equipment, system, and process i.e., components of a combustion gas stream (not shown), including, without limitation, a concentration of nitrogen oxides ($NO_x$) and a concentration of ammonia ($NH_3$) (neither shown in FIG. 1). Computing device 105 includes a memory device 110 and a processor 115 operatively coupled to memory device 110 for executing instructions. Processor 115 may include one or more processing units, e.g., without limitation, in a multi-core configuration. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 1), and these terms are used interchangeably herein.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 110 may be configured to store operational measurements including, without limitation, real-time and historical vibration values, and/or any other type data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate monitoring and control of the components within a combustion gas stream including, without limitation, $NO_x$ and $NH_3$ (discussed further below).

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with the electrical switchgear being monitored, such as by using a human machine interface (HMI) (not shown in FIG. 1).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices while performing as an input channel. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
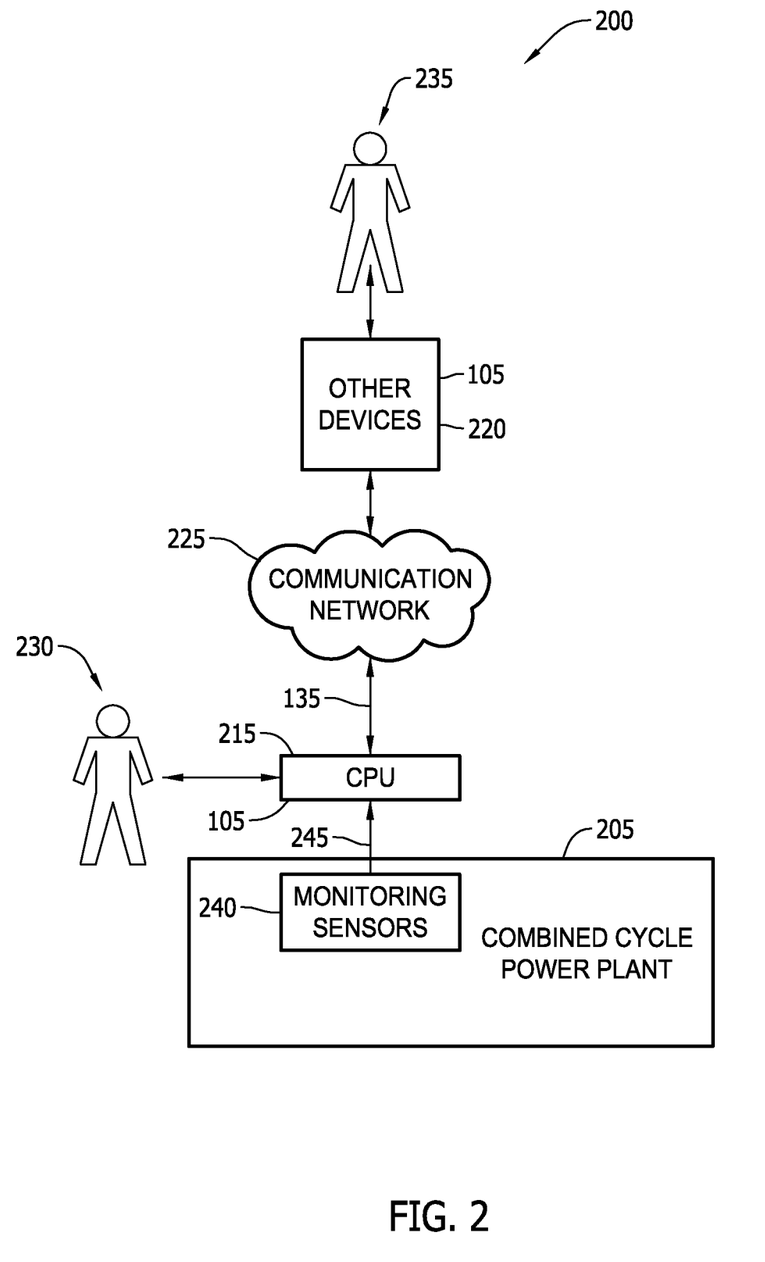
FIG. 2 is block diagram of a portion of an exemplary combustion product control system that may include the computing device shown in FIG. 1.

FIG. 2 is block diagram of a portion of an exemplary combustion product control system 200 that may be used to monitor and control at least a portion of an electric power generation system, i.e., in the exemplary embodiment, a combined cycle power plant 205. Alternatively, any electric power generation system that generates combustion gases with regulated combustion products may be monitored and controlled using a system substantially similar to system 200 as described herein, including, without limitation, coal-fired and oil-fired power plants.

Combustion product control system 200 includes at least one central processing unit (CPU) 215 configured to execute control algorithms and control logic. CPU 215 may be coupled to other devices 220 via a communication network 225. CPU 215 may be, without limitation, a facility-level centralized controller, a plant-level centralized controller, one of a plurality of distributed controllers, and a portable controller.

Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, CPU 215 may perform all of the operations below.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

As used herein, the terms "controller", "control system", and "processor" include any programmable system including systems and microcontrollers, reduced instruction set circuits, application specific integrated circuits, programmable logic circuits, and any other circuit capable of executing the functions described herein. The above examples are exemplary only, and thus are not intended to limit in any way the definition and/or meaning of the term processor. Moreover, CPU 215 may include sufficient processing capabilities to execute support applications including, without limitation, a Supervisory, Control and Data Acquisition (SCADA) system and a Data Acquisition System (DAS). Moreover, in some embodiments, at least a portion of combustion product control system 200 and additional portions (not shown) may be implemented within a broader control system (not shown) that enables operation of combined cycle power plant 205 as described herein, including, without limitation, those processors resident within personal computers, remote servers, programmable logic controllers (PLCs), distributed control system cabinets, and hand-held Internet-enabled devices.

CPU 215 interacts with a first operator 230 (e.g., via user input interface 130 and/or presentation interface 120). In one embodiment, CPU 215 presents information about combined cycle power plant 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining combined cycle power plant 205, including, without limitation, shift operations personnel, maintenance technicians, and facility supervisors.

In the exemplary embodiment, combined cycle power plant 205 includes one or more monitoring sensors 240 coupled to CPU 215 through at least one input channel 245. Monitoring sensors 240 collect operational measurements including, without limitation, $NH_3$ and $NO_x$ concentrations in a combustion gas exhaust stream (not shown in FIG. 2) generated within combined cycle power plant 205. Monitoring sensors 240 repeatedly, e.g., periodically, continuously, and/or upon request, transmit operational measurement readings at the time of measurement. CPU 215 receives and processes the operational measurement readings. Also, CPU 215 includes, without limitation, sufficient data, algorithms, and commands to facilitate control of constituents in the combustion exhaust gas stream, i.e., $NH_3$ and $NO_x$ concentrations (discussed further below).

Also, in alternative embodiments, additional monitoring sensors (not shown) similar to monitoring sensors 240 may collect operational data measurements associated with the remainder of combined cycle power plant 205, of which combustion product control system 200 is merely a portion of, including, without limitation, combustion exhaust gas stream temperatures, pressures, and gas flow rates. Such data is transmitted across network 225 and may be accessed by any device capable of accessing network 225 including, without limitation, desktop computers, laptop computers, and personal digital assistants (PDAs) (neither shown).

In the exemplary embodiment, monitoring sensors 240 may generate a large volume of data. Therefore, other devices 220 includes at least one data server with a database and storage system that enables operation of combined cycle power plant 205 and combustion product control system 200 as described herein.

Figure 3:
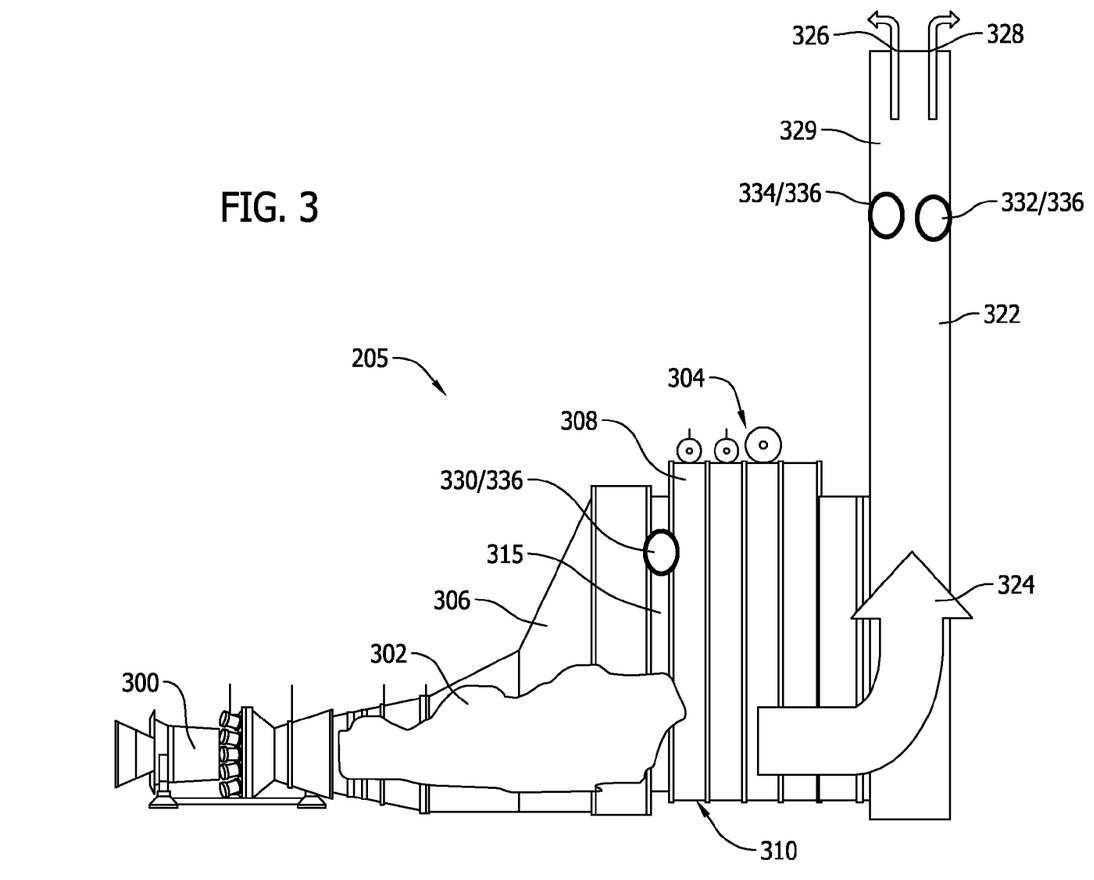
FIG. 3 is a schematic side view of an exemplary combined cycle power plant the may use the combustion product control system shown in FIG. 2.
Figure 4:
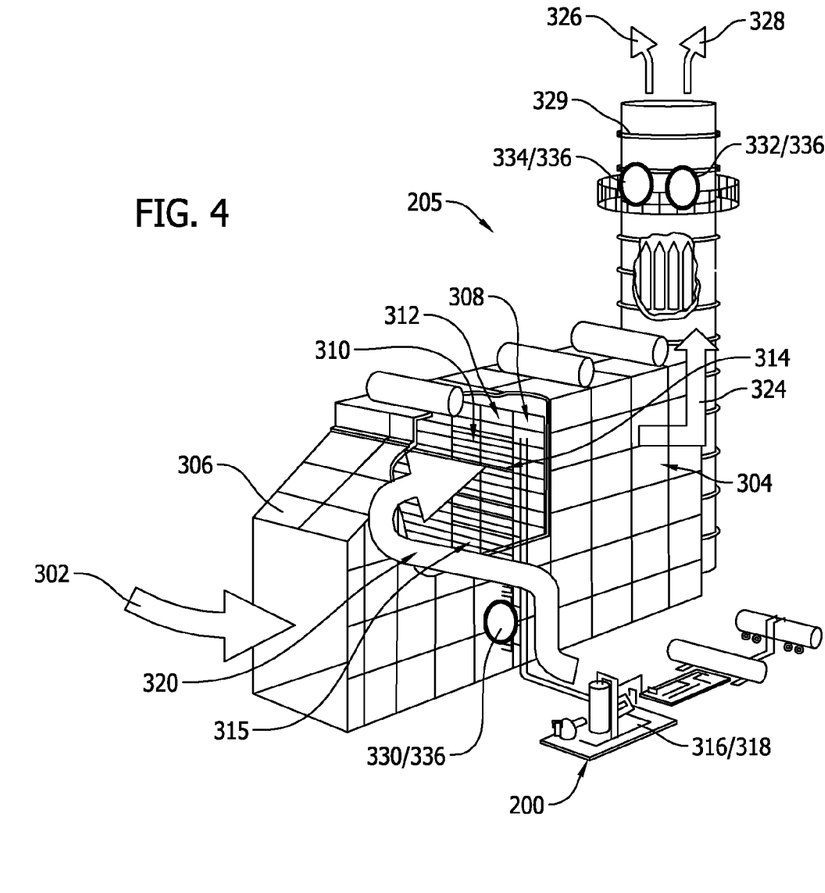
FIG. 4 is a schematic perspective view of the combined cycle power plant shown in FIG. 3.

FIG. 3 is a schematic side view of exemplary combined cycle power plant 205. FIG. 4 is a schematic perspective view of combined cycle power plant 205 with a portion of combustion product control system 200. In the exemplary embodiment, combined cycle power plant 205 includes a rotary machine 300 (only shown in FIG. 3), i.e., a turbomachine, and more specifically, a turbine engine. In the exemplary embodiment, turbine engine 300 is a gas turbine engine that generates a combustion exhaust gas stream 302. Alternatively, gas turbine engine 300 is a plurality of gas turbine engines 300. Combined cycle power plant 205 also includes a heat recovery steam generator (HRSG) 304 coupled in flow communication with gas turbine engine 300 via an exhaust gas conduit 306. HRSG 304 is coupled in flow communication with at least one steam turbine (not shown).

Also, in the exemplary embodiment, combined cycle power plant 205, and combustion product control system 200, includes a selective catalytic reduction (SCR) system 308 positioned at an inlet 310 to HRSG 304. SCR system 308 includes a plurality of catalyst blocks 312 and an $NH_3$ injection spray grid 314 (both only shown in FIG. 4) positioned upstream of catalyst blocks 312 at an SCR inlet 315. SCR system 308 also includes an $NH_3$ skid 316 coupled in flow communication to $NH_3$ injection spray grid 314. $NH_3$ skid 316 includes at least one combustion product control element, i.e., an $NH_3$ flow control device 318 for regulating a flow rate of injected $NH_3$ 320 (both only shown in FIG. 4) into combustion exhaust gas stream 302. $NH_3$ flow control device 318 is any device that enables operation of combined cycle power plant 205 and combustion product control system 200 as described herein, including, without limitation, metered positive displacement pump devices, variable speed centrifugal pump devices, and regulating valves.

Further, in the exemplary embodiment, combined cycle power plant 205 includes an exhaust stack 322 coupled in flow communication with HRSG 304. Exhaust stack 322 receives a cooled and reduced exhaust gas stream 324 that may include residual $NO_x$ 326 and unreacted $NH_3$, referred to as $NH_3$ slip 328. Exhaust stack 322 defines a stack outlet 329 that is open to atmosphere through which residual $NO_x$ 326 and $NH_3$ slip 328 and the remainder of reduced exhaust gas stream 324 is channeled. Combustion product control system 200 facilitates decreasing values of residual $NO_x$ 326 and $NH_3$ slip 328 to approximately zero.

Moreover, in the exemplary embodiment, combustion product control system 200 includes a first sensing device, i.e., a $NO_x$ sensor 330 positioned proximate inlet 315 of SCR system 308. $NO_x$ sensor 330 is configured to measure a concentration of $NO_x$ in combustion exhaust gas stream 302. Combustion product control system 200 also includes a second sensing device, i.e., a $NH_3$ slip sensor 332 positioned proximate stack outlet 329. $NH_3$ slip sensor 332 is configured to measure $NH_3$ slip in reduced exhaust gas stream 324. Combustion product control system 200 further includes a third sensing device, i.e., a $NO_x$ sensor 334 positioned proximate stack outlet 329. $NO_x$ sensor 334 is configured to measure a concentration of $NO_x$ in reduced exhaust gas stream 324. Combustion product control system 200 also includes any measurement sensors that enable operation of combustion product control system 200 as described herein, including, without limitation, $NH_3$ flow measurement devices, $NH_3$ pressure devices, gas temperature devices, gas flow devices, and gas pressure devices. Furthermore, in the exemplary embodiment, combined cycle power plant 205 includes a continuous emissions monitoring system (CEMS) 336. Sensing devices 330, 332, and 334 transmit measurement data to CEMS 336.

In operation, air is mixed with fuel (neither shown), and burned within gas turbine engine 300 to generate combustion exhaust gas stream 302 that is channeled downstream through exhaust gas conduit 306. Combustion product control system 200 is activated once gas turbine engine 300 has fired and will be active throughout startup to base load or from base load to a shutdown condition. $NO_x$ sensor 330 measures $NO_x$ concentration proximate inlet 315 of SCR system 308. $NH_3$ skid 316 channels $NH_3$ 320 to $NH_3$ injection spray grid 314 through $NH_3$ flow control device 318. $NH_3$ 320 is injected into combustion exhaust gas stream 302 and reacts with catalyst blocks 312 to remove $NO_x$ from combustion exhaust gas stream 302 as stream 302 is channeled through HRSG 304 to remove heat energy from stream 302 and generate reduced exhaust gas stream 324. Stream 324 is channeled through stack 322 and $NO_x$ sensor 334 and $NH_3$ slip sensor 332 measure a concentration of residual $NO_x$ 326 and $NH_3$ slip 328, respectively, in reduced exhaust gas stream 324 prior to exit through stack outlet 329.

Figure 5:
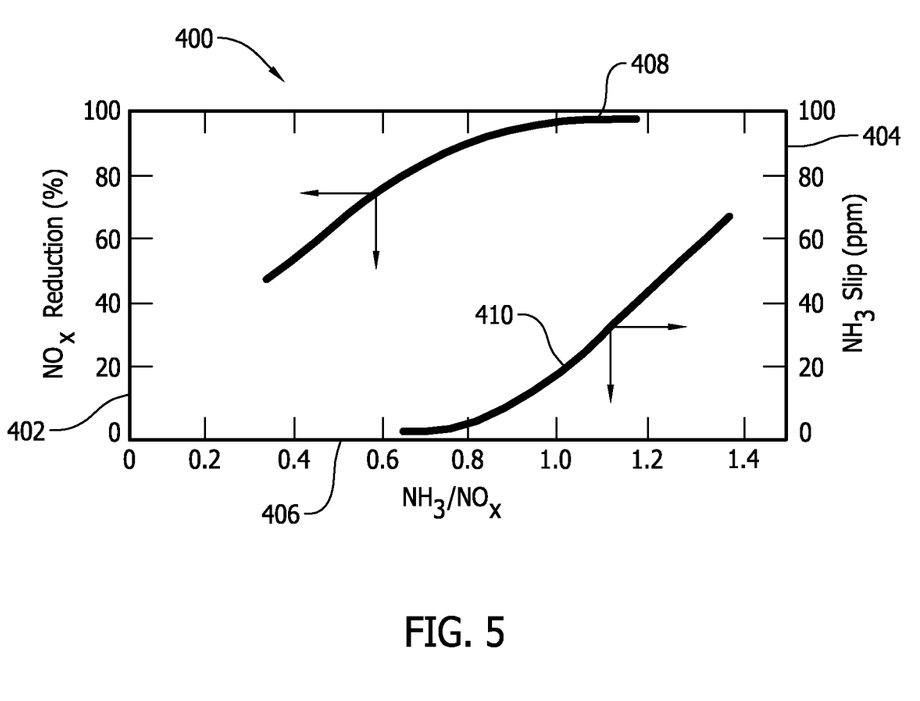
FIG. 5 is a graphical view of an exemplary relationship between nitrogen oxides ($NO_x$) and ammonia ($NH_3$) slip that may be measured and controlled in the combined cycle power plant shown in FIG. 3 using the combustion product control system shown in FIG. 2.

FIG. 5 is a graphical view, i.e., a graph 400 of an exemplary relationship between nitrogen oxides ($NO_x$) and ammonia ($NH_3$) slip that may be measured and controlled in combined cycle power plant 205 (shown in FIG. 3) using combustion product control system 200 (shown in FIG. 2). Graph 400 includes a first y-axis 402 representing a reduction of values of $NO_x$ in combustion exhaust gas stream 302 as measured by $NO_x$ sensor 330 to residual values of $NO_x$ 326 as measured by $NO_x$ sensor 334 in reduced exhaust gas stream 324 prior to exit through stack outlet 329 (all shown in FIGS. 3 and 4). First y-axis 402 includes values in units of percent (%) from 0% to 100% in 20% increments.

Graph 400 also includes a second y-axis 404 representing values of $NH_3$ slip 328 as measured by $NH_3$ slip sensor 332 in reduced exhaust gas stream 324 prior to exit through stack outlet 329 (all shown in FIGS. 3 and 4). Second y-axis 404 includes values in units of parts per million (ppm) from 0 ppm to 100 ppm in 20 ppm increments. Graph 400 further includes an X-axis 406 representing values of a ratio of $NH_3$ slip 328 to residual values of $NO_x$ 326, i.e., a $NH_3/NO_x$ ratio. X-axis 406 includes unitless values from 0 to 1.4 in increments of 0.2.

Graph 400 also includes a first curve, i.e., $NO_x$ reduction curve 408. As the $NH_3/NO_x$ ratio increases, the percentage of $NO_x$ removal by combustion product control system 200 (shown in FIGS. 2, 3, and 4) increases asymptotically toward 100%. Graph 400 further includes a second curve, i.e., a $NH_3$ slip curve 410. As the $NH_3/NO_x$ ratio increases, values for $NH_3$ slip increase, initially slowly between a $NH_3/NO_x$ ratio of approximately 0.65 and approximately 0.9, and then substantially linearly above the $NH_3/NO_x$ ratio value of approximately 0.9. In general, control of the $NH_3/NO_x$ ratio values within a range extending between approximately 0.65 and approximately 0.9 provides a satisfactory balance between enhanced $NO_x$ reduction and enhanced $NH_3$ slip reduction.

Figure 6:
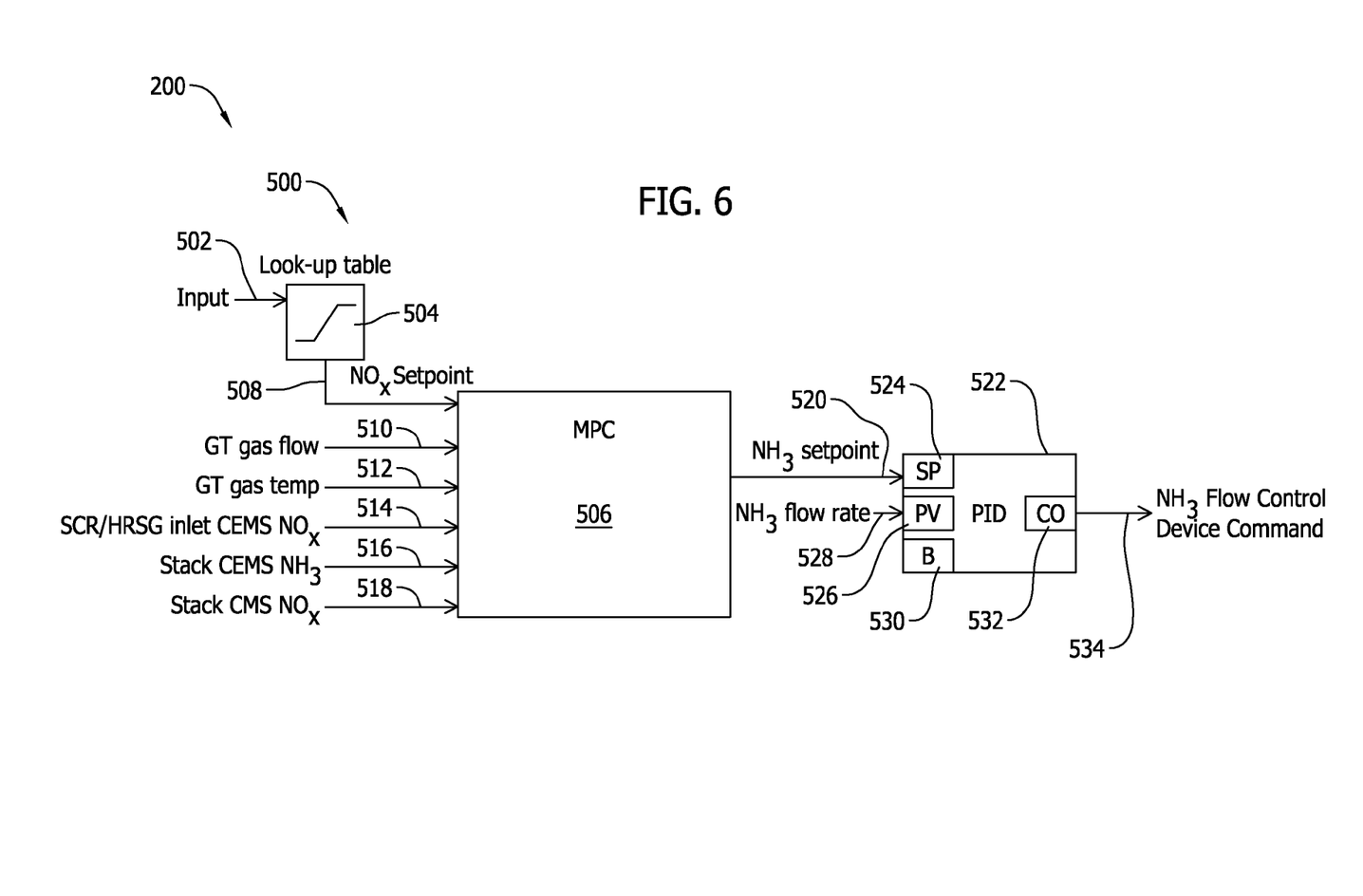
FIG. 6 is a schematic view of an exemplary control architecture that may be used with the combustion product control system shown in FIG. 2.

FIG. 6 is a schematic view of an exemplary control architecture 500 that may be used with combustion product control system 200. In the exemplary embodiment, system 200 is implemented in CPU 215 (shown in FIG. 2). Control architecture 500 includes at least one input channel 502 and at least one look-up table 504 programmed therein. Input channel 502 is configured to transmit signals, e.g., without limitation, actual power generation demand, actual power generation, and actual measured flow of combustion exhaust gas stream 302 (shown in FIGS. 3 and 4) from a larger control system. Such input signals include transient values. Look-up table 504 includes values of $NO_x$ setpoints as a function of the input.

Also, in the exemplary embodiment, control architecture 500 includes a model predictive control (MPC) module 506. MPC module 506 is a robust, high-fidelity, physics-based model (not shown) of SCR system 308, including, without limitation, catalyst blocks 312, $NH_3$ injection spray grid 314, $NH_3$ skid 316, and $NH_3$ flow control device 318 (all shown in FIGS. 3 and 4). MPC module 506 also includes a high-fidelity physics-based model of any additional components of combined cycle power plant 205 (shown in FIGS. 3 and 4) that enable operation of control architecture 500 and combustion product control system 200 as described herein. MPC module 506 may be implemented in any platform that enables operation of control architecture 500 and combustion product control system 200 as described herein.

Further, in the exemplary embodiment, the high-fidelity physics-based model of SCR system 308 programmed within MPC module 506 includes a series of implemented algorithms defining the model of the processes to be controlled within SCR system 308. The model is a linearized kinetic lumped-parameter model that simplifies a description of the behavior of the spatially distributed physical components. SCR system 308 is represented with a simplified topology including a finite number of discrete entities that approximate the behavior of the distributed SCR system 308 under certain assumptions with a finite number of parameters. In the exemplary embodiment, the model of SCR system 308 is at least partially based on capturing the kinetics and mass transfer of $NH_3$ and $NO_x$ within the relevant portions of combined cycle power plant 205, e.g., SCR 308.

For example, and without limitation, the series of algorithms programmed in MPC module 506 includes those algorithms necessary to implement an extended Kalman filter, i.e., an efficient recursive filter that estimates the internal state of a linear dynamic system from a series of measurements observed over time, such measurements containing noise (random variations) and other inaccuracies, and produces estimates of unknown variables that tend to be more precise than those that would be based on a single measurement alone. Therefore, such implemented extended Kalman filters operate recursively on streams of noisy input data to produce a statistically optimal estimate of the underlying system state. The extended Kalman filter uses a dynamic model of SCR system 308, i.e., a linearized kinetic lumped-parameter model at least partially based on the physical laws of motion, including, without limitation, capturing the kinetics and mass transfer of $NH_3$ and $NO_x$ within SCR 308. The extended Kalman filter also receives multiple sequential measurements from sensors such as, and without limitation, $NO_x$ sensors 330 and 334 and $NH_3$ slip sensor 332. The high-fidelity physics-based model and measurements from sensors 330, 332, and 334 cooperate to form an estimate of SCR system's 308 varying quantities that is better than the estimate obtained by using any one measurement alone.

In addition, due the Kalman filter algorithms' recursive nature, it can run in real-time using only the present input measurements from sensors 330, 332, and 334 and the previously calculated state. Therefore, extensive storage of historical data is not required. Furthermore, because the certainty of the measurements is often difficult to measure precisely, a Kalman gain that is a function of the relative certainty of the measurements and current state estimate is self-tuned to achieve a predetermined performance. Therefore, over time, the generated control solution captures long-term effects, such as, without limitation, effects of deactivation of catalyst 312, performance of $NH_3$ injection spray grid 314, and changes to combustion exhaust gas stream 302.

Moreover, in the exemplary embodiment, the model of SCR system 308 generates predictions of responses of SCR system 308 to certain control changes. This sequence of predictions is an effective constrained control solution for such a multiple input-multiple output (MIMO) system with complex process dynamics as is found in SCR system 308, combustion product control system 200, and combined cycle power plant 205. The generated control solution, sometimes referred to as an "optimized solution," facilitates driving the associated processes toward enhanced performance within the predetermined parameter-driven constraints. At least some of those constraints are temporal constraints, e.g., without limitation, transit times of $NH_3$ from $NH_3$ skid 316 to $NH_3$ injection spray grid 314, transit times of $NH_3$ across catalyst blocks 312, and reaction times of $NH_3$ with catalyst 312. The generated control solution includes control changes that will facilitate driving the processes to the desired condition. More specifically, the generated control solution includes a sequence of control changes to the associated process setpoints so that the predicted response moves to the desired setpoint in an optimal manner as a function of the sequence of predicted responses.

Also, in the exemplary embodiment, MPC module 506 is tuned for a receding control horizon, a prediction horizon, and the relative weights of different factors considered in the optimization objective. Specifically, a plurality of control moves are calculated at each sampling time, while only the first move is actually implemented. Such implementation of a receding control horizon facilitates accounting for new measurements when made available at the next sampling time. The control moves are calculated based on relative importance, i.e., weighting of desired objectives and constraints.

Alternatively, the model of SCR system 308 may be any model that enables operation of control architecture 500 and combustion product control system 200 as described herein, including, without limitation, an empirical model.

Further, in the exemplary embodiment, MPC module 506 is configured to receive a $NO_x$ setpoint signal 508 form lookup table 504. MPC module 506 is also configured to receive additional signals, including, without limitation, flow rates 510 and temperatures 512 of combustion exhaust gas stream 302 from flow and temperatures sensors, respectively, (neither shown), SCR/HRSG Inlet CEMS $NO_x$ 514 from $NO_x$ sensor 330, stack CEMS $NH_3$ 516 from $NH_3$ slip sensor 332, and stack CEMS $NO_x$ 518 from $NO_x$ sensor 334. MPC module 506 uses the model described above to generate and transmit a $NH_3$ flow rate setpoint signal 520. Signal 520 is also generated at least partially due to predicted $NH_3$ slip spikes caused by latent $NH_3$ from previous operation.

Moreover, in the exemplary embodiment, control architecture 500 includes a single proportional-integral-differential (PID) controller 522 implemented therein. PID controller 522 is coupled to MPC module 506 through a setpoint (SP) input portion 524 of PID controller 522 that receives $NH_3$ flow rate setpoint signal 520. PID controller 522 also includes a primary variable (PV) input portion 526 that receives a $NH_3$ flow rate input signal 528 from a flow sensor associated with $NH_3$ skid 316 to measure flow of injected $NH_3$ 320 (both shown in FIG. 5). PID controller 522 further includes a bias portion 530 that is configured to regulate the bias of PID controller 522. PID controller 522 also includes a command (CO) output portion 532 that generates and transmits a $NH_3$ flow control device command signal 534 to $NH_3$ flow control device 318 (shown in FIG. 5). In some embodiments, PID controller 522 is part of a larger control system (not shown). Alternatively, control architecture 500 includes no PID controllers. In such alternative embodiments, MPC module 506 is coupled directly to $NH_3$ flow control device 318 and transmits $NH_3$ flow rate setpoint signal 520 directly to device 318.

Furthermore, in the exemplary embodiment, control architecture 500 is programmed to generate predetermined parameters for $NO_x$ values, i.e., $NO_x$ setpoint signals 508, in combustion exhaust gas stream 302 at least partially as a function of transient conditions of stream 302. Such transient conditions include, without limitation, startups and shutdowns of combined cycle power plant 205, and electric power generation ramps that approach and/or exceed predetermined power generation ramp parameters based at least partially on associated $NO_x$ and $NH_3$ slip parameters. Therefore, in addition to effective $NO_x$ and $NH_3$ slip control on conventional starts, control architecture 500 is programmed to generate optimal setpoints that also enable robust control during faster loading of gas turbine engine 300 (shown in FIG. 3) early in the start, e.g., during rapid response starts.

Control architecture 500 is also programmed to use model predictive control (MPC) processing within MPC module 506 to generate predetermined values for a $NH_3$ injection rate, i.e., $NH_3$ flow control device command signal 534 during such transients of combustion exhaust gas stream 302. The predetermined values vary at least partially as a function of modeled operational characteristics of at least one of combined cycle power plant 205 and combustion exhaust gas stream 302. In addition, the predetermined values for $NH_3$ flow control device command signal 534 are based on $NH_3$:$NO_x$ ratio 408 (shown in FIG. 5) required to bring NOx emission levels within compliance limits, and at the same time mitigating excess $NH_3$ slip. Therefore, control architecture 500 is further programmed to regulate $NH_3$ flow control device 318 to facilitate simultaneous regulation of the measured concentration of $NO_x$ in reduced exhaust gas stream 324, i.e., $NO_x$ signal 518 within predetermined $NO_x$ parameters and regulation of the measured $NH_3$ slip, i.e., $NH_3$ signal 516 in stream 324 proximate predetermined $NH_3$ slip values. The calculated optimized setpoints 520 for $NH_3$ injection during load transients are determined to facilitate keeping emissions, i.e., $NO_x$ levels, within established parameters without having to switch between solely $NO_x$ control and solely $NH_3$ slip control modes.

During transient events, rapid changes in operating conditions, such as, without limitation, temperature, inlet $NO_x$, and $NH_3$ injection rates take place and will be captured by the model. Depending on these factors, the amount of $NH_3$ adsorbed by catalyst 312, and the rate at which $NH_3$ is desorbed back into combustion exhaust gas stream 302, will affect the available $NH_3$ for reaction significantly. The varying setpoints will account for the changing adsorption-desorption behavior of catalyst 312. The model also captures latent $NH_3$ spikes from unreacted $NH_3$ in HRSG 304.

Figure 7:
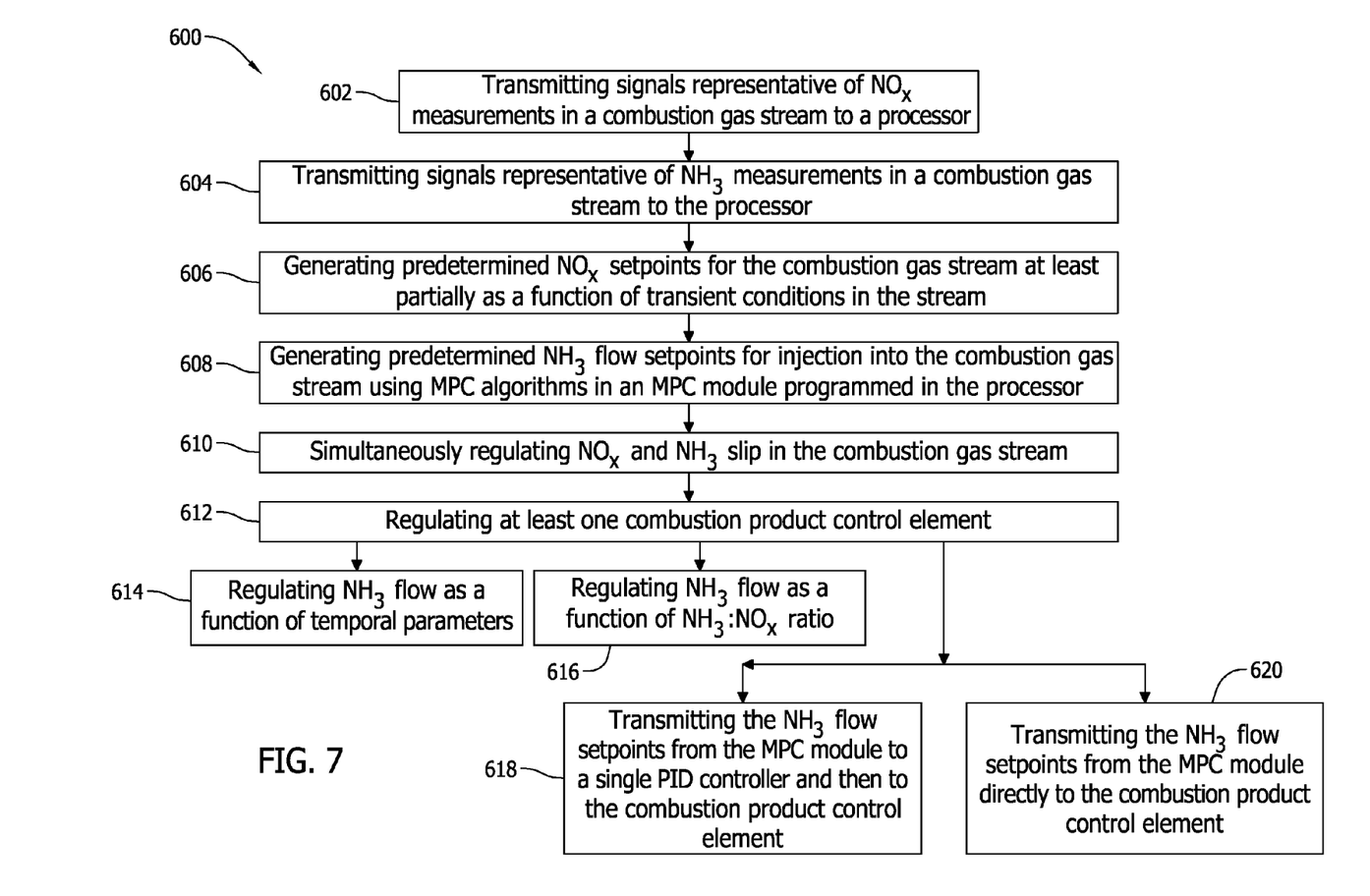
FIG. 7 is a flow chart of an exemplary method of controlling combustion products that may use the combustion product control system shown in FIG. 2.

FIG. 7 is a flow chart of an exemplary method 600 of controlling combustion products, i.e., $NO_x$ that may use combustion product control system 200 (shown in FIG. 2). In the exemplary embodiment, SCR/HRSG inlet CEMS $NO_x$ signal 514 and stack CEMS $NO_x$ signal 518 are transmitted 602 to MPC module 506 (all shown in FIG. 5) that is implemented in CPU 215 (shown in FIG. 2). Also, stack CEMS $NH_3$ signal 516 is transmitted 604 to MPC module 506. Further, CPU 215 generates 606 predetermined parameters for $NO_x$ values, i.e., $NO_x$ setpoint signals 508 (shown in FIG. 6) in combustion exhaust gas stream 302 and/or reduced exhaust gas stream 324 (both shown in FIG. 4) at least partially as a function of transient conditions in streams 302 and/or 324.

Moreover, CPU 215 generates 608 predetermined values for $NH_3$ injection, i.e., $NH_3$ flow control device command signal 534 (shown in FIG. 6) during the transients of combustion exhaust gas stream 302 and/or reduced exhaust gas stream 324 using MPC algorithms programmed within MPC module 506. Values of $NH_3$ flow control device command signal 534 vary at least partially as a function of modeled fluid stream characteristics during transients of combustion exhaust gas stream 302 and/or reduced exhaust gas stream 324. Such transient conditions include, without limitation, startups and shutdowns of combined cycle power plant 205, and electric power generation ramps that approach and/or exceed predetermined power generation ramp parameters based at least partially on associated $NO_x$ and $NH_3$ slip parameters.

Also, CPU 215 simultaneously regulates 610 the measured concentration of $NO_x$ in streams 302 and/or 324, i.e., SCR/HRSG inlet CEMS $NO_x$ signal 514 and/or stack CEMS $NO_x$ signal 518 within the predetermined $NO_x$ parameters, i.e., $NO_x$ setpoint signals 508 and the measured $NH_3$ slip in stream 324 within the predetermined $NH_3$ slip values, i.e., calculated optimized $NH_3$ flow rate setpoint signal 520.

Further, at least one combustion product control element, i.e., $NH_3$ flow control device 318 is regulated 612. A flow rate of injected $NH_3$ 320 (shown in FIG. 4) into combustion exhaust gas stream 302 is regulated 614 at least partially as a function of temporal parameters and regulated 616 at least partially based on the ratio of the measured $NH_3$ slip to the measured $NO_x$, i.e., $NH_3/NO_x$ (X-axis 406 shown in FIG. 5). $NH_3$ flow rate setpoint signals 520 are transmitted 618 from the high-fidelity physics-based model of SCR system 308 in MPC module 506 to single PID controller 522 coupled to $NH_3$ flow control device 318. Alternatively, $NH_3$ flow rate setpoint signals 520 are transmitted 620 from the high-fidelity physics-based model of SCR system 308 in MPC module 506 directly to $NH_3$ flow control device 318.

In contrast to known combustion product control systems, the computer-based combustion product control systems as described herein facilitate effective $NO_x$ control while mitigating $NH_3$ slip. Specifically, a high-fidelity physics-based model of an SCR and associated equipment and processes are programmed into a processor to define an MPC module. In contrast to generating setpoints merely based on operating experience or a predetermined schedule, the model captures the kinetics and mass transfer for characteristics associated with $NO_x$ reduction, including those associated with catalyst deactivation over time. Also, in contrast to conventional rapid changes in control mode from $NO_x$ control at base load to $NH_3$ slip control during startup and shutdown, resulting in changing setpoints and a scheduled trade-off between $NO_x$ reduction and $NH_3$ slip reduction, the computer-based combustion product control systems as described herein facilitate $NO_x$ reduction and $NH_3$ slip reduction achievement regardless of the state of operation of the combustion systems. Further, in contrast to conventional cascaded control architectures for both $NO_x$ control and $NH_3$ slip control, the computer-based combustion product control systems as described herein use a single PID, if any PIDs are used. Therefore, In contrast to known combustion product control systems, the computer-based combustion product control systems as described herein facilitate reducing unnecessary usage of $NH_3$, thereby facilitating a cumulative cost savings for operations and maintenance managers.

An exemplary technical effect of the methods, systems, and apparatus described herein includes at least one of: (a) determining enhanced balances between $NO_x$ control and $NH_3$ slip control, regardless of the state of operation of the associated combustion gas source; (b) regulating $NH_3$ flow into a combustion gas stream such that effective $NO_x$ control is achieved while effectively controlling $NH_3$ slip; and (c) reducing $NH_3$ usage.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. A combustion product control system comprising:
    a first sensing device configured to measure a concentration of oxides of nitrogen ($NO_x$) in a fluid stream;
    a second sensing device configured to measure ammonia ($NH_3$) slip in the fluid stream;
    at least one combustion product control element; and
    at least one processor coupled to said first sensing device, said second sensing device, and said at least one combustion product control element, said at least one processor programmed to:
        generate predetermined parameters for $NO_x$ values in the fluid stream at least partially as a function of transient fluid stream conditions;
        use model predictive control (MPC) processing to generate a sequence of predicted responses to the transient fluid stream conditions, thereby generating a sequence of control changes to setpoint values for a $NH_3$ injection rate during fluid stream transients, wherein said setpoint values vary at least partially as a function of modeled fluid stream characteristics, wherein the fluid stream transients comprise:
            startups of a combined cycle power generation system;
            shutdowns of the combined cycle power generation system; and
            electric power generation ramps that one of approach and exceed predetermined power generation ramp parameters; and
        regulate said at least one combustion product control element to facilitate simultaneous regulation of the measured concentration of $NO_x$ in the fluid stream within said predetermined $NO_x$ parameters and regulation of the measured $NH_3$ slip in the fluid stream within predetermined $NH_3$ slip parameters.

2. The combustion product control system in accordance with claim 1, wherein said at least one processor programmed to use MPC processing is programmed with a model of a selective catalytic reduction (SCR) system in a combined cycle power generation facility, said model at least partially based on kinetics and mass transfer of $NH_3$ and $NO_x$ within the combined cycle generation facility.

3. The combustion product control system in accordance with claim 2, wherein said model is directly coupled to said at least one combustion product control element.

4. The combustion product control system in accordance with claim 2, wherein said at least one processor comprises a single proportional-integral-differential (PID) controller coupled to said at least one combustion product control element and said model.

5. The combustion product control system in accordance with claim 1, wherein said at least one combustion product control element is at least one $NH_3$ flow control device.

6. The combustion product control system in accordance with claim 1, wherein said first sensing device and said second sensing device are further configured to transmit the respective measurements to a continuous emissions monitoring system (CEMS).

7. The combustion product control system in accordance with claim 6, wherein the fluid stream is a combustion gas stream generated by at least one gas turbine engine and channeled to a heat recovery steam generator (HRSG) and a stack coupled to the HRSG, said first sensing device is positioned proximate each of an inlet of the HRSG and an outlet of the stack, said second sensing device is positioned proximate the outlet of the stack.

8. A method of controlling combustion products, said method comprising:
    transmitting a signal representative of a concentration of oxides of nitrogen ($NO_x$) in a fluid stream to at least one processor;
    transmitting a signal representative of an ammonia ($NH_3$) slip in the fluid stream to the at least one processor;
    generating, within the at least one processor, predetermined parameters for $NO_x$ values in the fluid stream at least partially as a function of transient fluid stream conditions;
    generating a sequence of predicted responses to the transient fluid stream conditions, thereby generating a sequence of control changes to setpoint values for $NH_3$ injection during fluid stream transients using model predictive control (MPC) algorithms programmed within the at least one processor, wherein the setpoint values vary at least partially as a function of modeled fluid stream characteristics, wherein the fluid stream transients include:
        starting up a combined cycle power generation system;
        shutting down the combined cycle power generation system; and
        electric power generation ramps that one of approach and exceed predetermined power generation ramp parameters; and
    regulating at least one combustion product control element, thereby simultaneously regulating the measured concentration of $NO_x$ in the fluid stream within the predetermined $NO_x$ parameters and regulating the measured $NH_3$ slip in the fluid stream within predetermined $NH_3$ slip parameters.

9. The method in accordance with claim 8, wherein regulating at least one combustion product control element comprises regulating a flow rate of $NH_3$ injection into the fluid stream at least partially as a function of temporal parameters.

10. The method in accordance with claim 8, wherein regulating at least one combustion product control element comprises simultaneously regulating the measured concentration of $NO_x$ in the fluid stream and regulating the measured $NH_3$ slip in the fluid stream at least partially based on a ratio of the measured $NH_3$ slip to the measured $NO_x$.

11. The method in accordance with claim 8, wherein regulating at least one combustion product control element comprising transmitting signals from a model of a selective catalytic reduction (SCR) system directly to at least one combustion product control element, the model at least partially based on kinetics and mass transfer of $NH_3$ and $NO_x$ within the SCR.

12. The method in accordance with claim 8, wherein regulating at least one combustion product control element comprises transmitting signals from a model of a SCR system to a single proportional-integral-differential (PID) controller coupled to the at least one combustion product control element, the model at least partially based on kinetics and mass transfer of $NH_3$ and $NO_x$ within the SCR.

13. The method in accordance with claim 8, wherein generating predetermined parameters for $NO_x$ values in the fluid stream at least partially as a function of transient fluid stream conditions comprises transmitting a $NO_x$ setpoint value to a MPC module implemented in the at least one processor.

14. A power generation facility comprising:
   at least one combustion gas source configured to generate a combustion gas stream;
   at least one selective catalytic reduction (SCR) system coupled to said at least one combustion gas source and configured to receive at least a portion of the combustion gas stream; and
   a combustion product control system comprising:
      a first sensing device configured to measure a concentration of oxides of nitrogen ($NO_x$) in the combustion gas stream;
      a second sensing device configured to measure ammonia ($NH_3$) slip in the combustion gas stream;
      at least one $NH_3$ flow control device; and
      at least one processor coupled to said first sensing device, said second sensing device, and said at least one $NH_3$ flow control device, said at least one processor programmed to:
         generate predetermined parameters for $NO_x$ values in the combustion gas stream at least partially as a function of transient combustion gas stream conditions;
         use model predictive control (MPC) processing to generate a sequence of predicted responses to the transient combustion gas stream conditions, thereby generating a sequence of control changes to setpoint values for a $NH_3$ injection rate during combustion gas stream transients, wherein said setpoint values vary at least partially as a function of modeled operational characteristics of at least one of said power generation facility and said combustion gas stream, wherein the gas stream transients comprise:
            startups of said combined cycle power generation system;
            shutdowns of said combined cycle power generation system; and
            electric power generation ramps that one of approach and exceed predetermined power generation ramp parameters; and
         regulate said at least one $NH_3$ flow control device to facilitate simultaneous regulation of the measured concentration of $NO_x$ in the combustion gas stream within said predetermined $NO_x$ parameters and regulation of the measured $NH_3$ slip in the combustion gas stream within predetermined $NH_3$ slip parameters.

15. The power generation facility in accordance with claim 14, wherein said at least one combustion gas source and said at least one SCR system at least partially define a combined cycle power generation system, said at least one processor programmed to use MPC processing is programmed with a model of said SCR system, said model at least partially based on kinetics and mass transfer of $NH_3$ and $NO_x$ within said SCR system.

16. The power generation facility in accordance with claim 15, wherein model of said SCR system is one of:
   directly coupled to said at least one $NH_3$ flow control device; and
   coupled to a single proportional-integral-differential (PID) controller implemented within said at least one processor, said PID controller coupled to said at least one $NH_3$ flow control device.

17. The power generation facility in accordance with claim 14 further comprising a continuous emissions monitoring system (CEMS), wherein said first sensing device and said second sensing device are further configured to transmit the respective measurements to said CEMS.

\* \* \* \* \*